United States Patent

[11] 3,631,263

[72] Inventors Ian H. Graham;
       Harry A. Skovmand; Jack S. Swartz, all of
       San Jose, Calif.
[21] Appl. No. 1,666
[22] Filed Jan. 9, 1970
[45] Patented Dec. 28, 1971
[73] Assignee International Business Machines
       Corporation
       Armonk, N.Y.

[54] SIGNAL DETECTION CIRCUIT
     10 Claims, 9 Drawing Figs.
[52] U.S. Cl. .................................................. 307/231,
                                              307/235, 328/115
[51] Int. Cl. ....................................................... H03k 17/00
[50] Field of Search ............................................ 328/114,
                                         115, 14 G; 307/231, 235

[56] References Cited
     UNITED STATES PATENTS
3,048,717 8/1962 Jenkins .......................... 328/114
3,437,833 4/1968 Razaitis et al .................. 328/114 X Primary Examiner—Donald D. Forrer
Assistant Examiner—B. P. Davis
Attorney—Sughrue, Rothwell, Mion, Zinn & Macpeak ABSTRACT: A readout signal is channeled through two paths, one for identifying signal peaks, the other for sensing slope and net change of signal voltage or pulse amplitude. A gate generator allows reading a pulse only when slope sense and amplitude change are acceptable and coincident with a detected signal peak.

INVENTORS
IAN H. GRAHAM
HARRY A. SKOVMAND
JACK S. SWARTZ

BY Sughrue, Rothwell, Mion, Zinn & Macpeak

ATTORNEYS

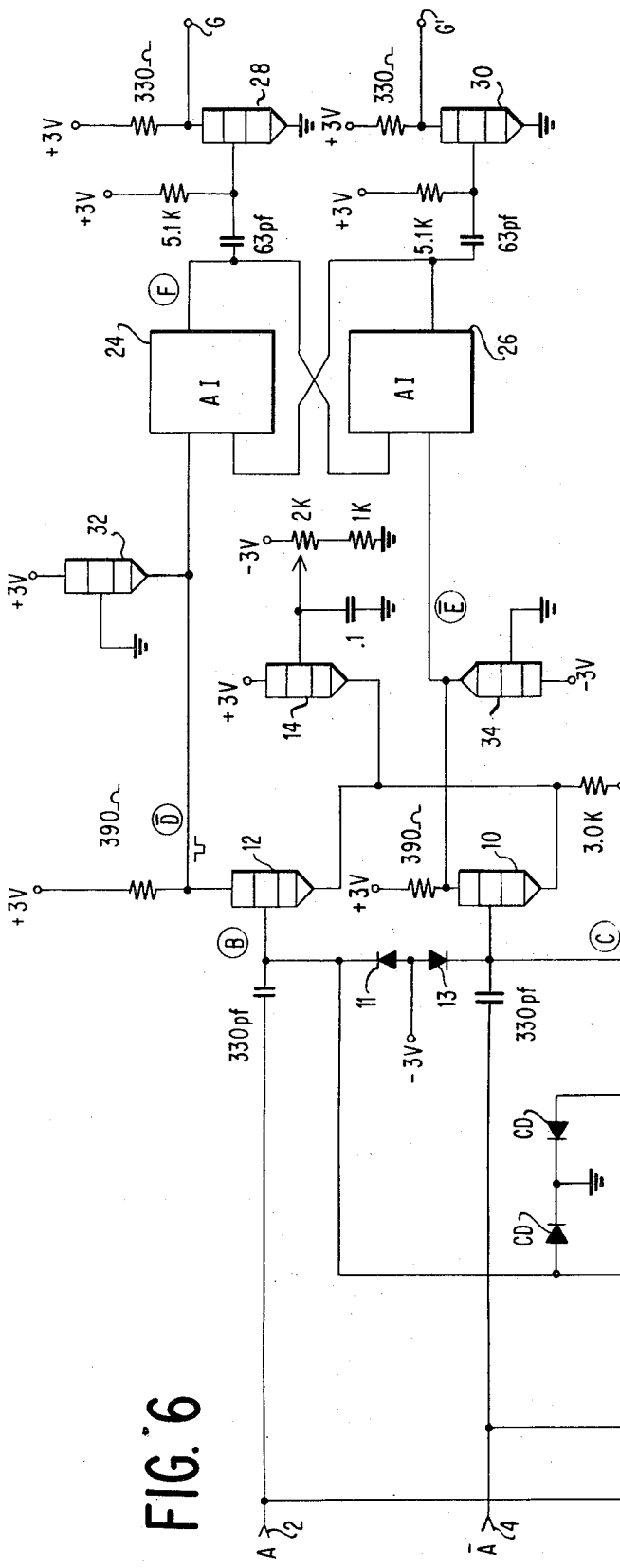
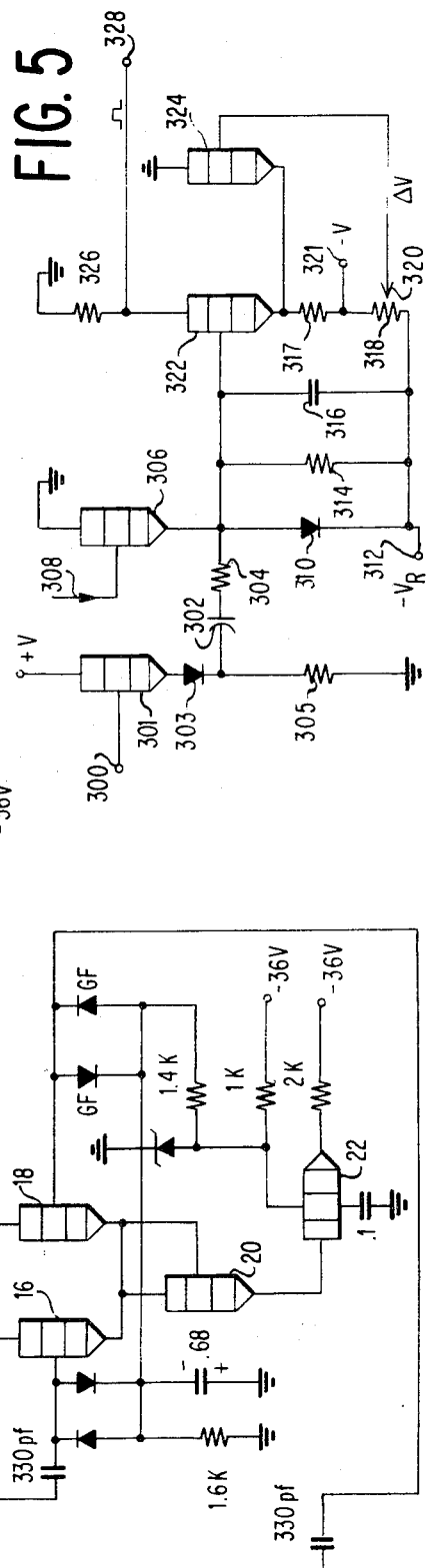
FIG. 5
FIG. 6

SIGNAL DETECTION CIRCUIT

BACKGROUND OF THE INVENTION

1. Field of the Invention

This invention relates to a novel and improved signal detection circuit, and in particular to a high density data readout system.

2. Description of the Prior Art

The trend in the technology of recording systems is to record data with higher and higher densities and closely packed data pulses to utilize the available storage surface in an optimum manner. Apparently, as packing densities are increased, there are attendant problems, such as pulse crowding, with resultant reduction in signal amplitude of adjacent bits, asymmetry of the pulses, bit shift, and the like. Thus, during the readback process, low amplitude noise signals, sloping shoulder portions between data bits, and other spurious nondata voltages, may be detected and interpreted erroneously as data; or valid data may be distorted or lost.

SUMMARY OF THE INVENTION

An object of this invention is to provide a more reliable signal detection circuit, wherein transients and noise signals are eliminated from the readback output signal.

Another object of this invention is to provide a signal detector operable with high density data, wherein noise and signal overshoot are easily separated from the valid data.

According to this invention, readout data is passed to an output or utilization device only if four prescribed conditions are met by each data bit or pulse; namely, (1) a minimum leading positive, or negative, slope; (2) a zero slope peak; (3) a minimum negative, or positive, slope; and (4) a minimum amplitude. To sense each pulse for these conditions, the readout circuit has two signal channels including, inter alia, a peak detector, a slope detector, and a circuit designated as a ΔV detector which senses the net change of amplitude of the linear readout signal after each peak. To obtain a valid data pulse, the peak detected signal is delayed and applied to a logic AND circuit with a gating pulse developed by the ΔV detector.

BRIEF DESCRIPTION OF THE DRAWINGS

The invention will be described in greater detail with reference to the drawing in which:

FIG. 5 is a schematic circuit diagram of a ΔV detector as used in the circuit of FIG. 3.

FIG. 6 is a schematic diagram of the gate generator, found in FIG. 3.

DETAILED DESCRIPTION OF THE DRAWINGS

Figure 1:
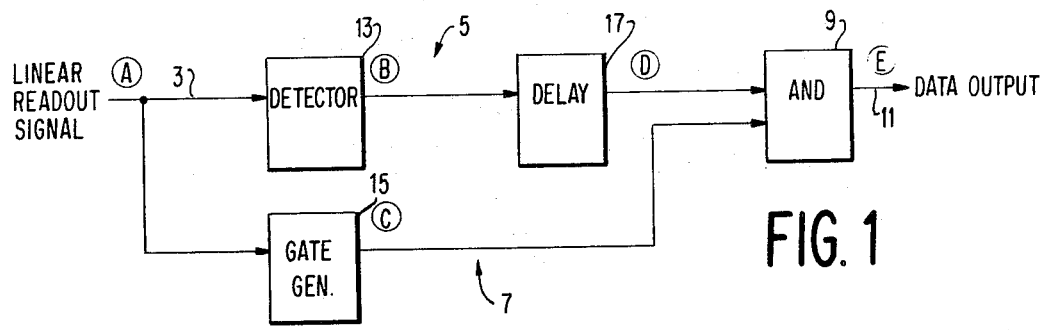
FIG. 1 is a block circuit diagram depicting the basic concept of this invention.
Figure 2:
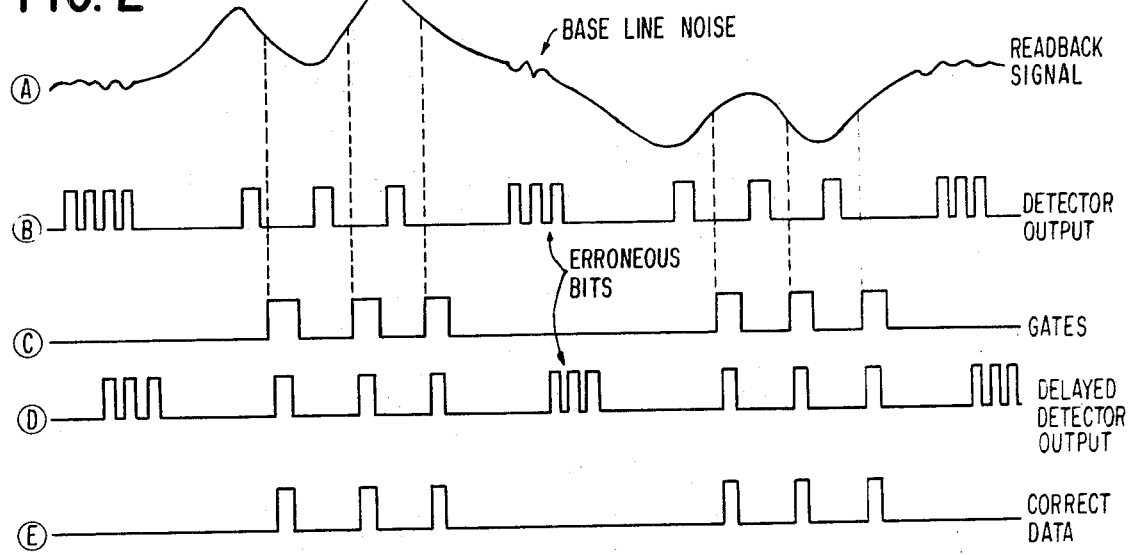
FIG. 2 is a timing diagram of the signals produced with the circuit of FIG. 1.

In accordance with the basic concept of the present invention, and as illustrated by the block diagram in FIG. 1 and the waveforms of FIG. 2, a linear signal such as that shown at A in FIG. 2 represents a raw readout signal and is applied to a pair of detection channels 5 and 7 at input terminal 3. Both channels 5 and 7 are connected at their output sides to an AND gate circuit means 9 whose output at output terminal 11 represents the data output. Channel 5 includes a peak detector 13 which may be a conventional peak detector of the type used in readout systems for double-frequency-type recording. The output from peak detector 13, illustrated by waveform B in FIG. 2, is connected to and delayed by delay means 17 and then applied to the AND-gate 9. Delay means 17 operates to align the peak detector output pulses with the gating pulses, to be described hereafter, generated by channel 7.

Channel 7 includes a gate generator 15 which operates to provide gating output pulses in response to the slopes in the raw readback signal meeting predetermined requirements set by circuitry included in the gating generator 15. Basically, the requirements are that the slope must have at least a minimum amplitude and must be of opposite sense to the previously detected slope also having at least said minimum amplitude. The gating pulses produced by gate generator 15 are shown in waveform C of FIG. 2. Since the criteria for generating a gating pulse depends in part on the slope trailing the peak, the gating pulse necessarily occurs after the peak pulse output. Consequently, delay means 17 is needed to properly align the pulses from the peak detector 13 with the gating pulses from gate generator 15.

Figure 3:
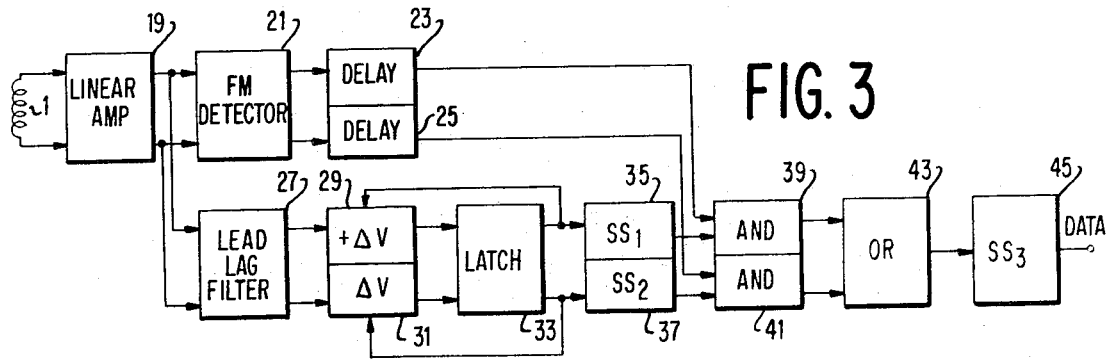
FIG. 3 is a block diagram of the inventive circuit in greater detail.

In the more detailed block diagram shown in FIG. 3, the readout coil 1 is connected to a linear amplifier 18 which provides two outputs representing respectively the raw readout signal at 0° phase and the raw readout signal at 180° phase. The opposite phase signals are used to enable the detection circuitry, which is duplicated for each of the two phase waveforms, to detect only the positive peaks in both waveforms. It will be noted that the positive peaks in the phase reversed raw readout signal correspond to the negative peaks in the nonphase reversed raw readout signal. The 0° and 180° signals are applied to a peak detector 21 which is illustrated in more detail in FIG. 4 and which comprises a differentiator 47, overdriven amplifiers 49, detectors 51, and output driver amplifiers 53. The differentiators 47 produce base line crossovers for each positive peak of the input signals and drive the overdriven amplifiers 49 which may be several DC coupled amplifiers. The amplifiers 49 overdrive and clip the input signals thereto producing a series of square waves of different lengths equal to the spacing between signal peaks. The square waves are applied to detectors 51 which produce output pulses, one for each positive leading edge of the pulses applied thereto. The latter pulses are amplified by the output driver amplifier 53 and applied as the output of peak detector 21 to the delay circuits 23 and 25.

The 0° and 180° readout signals are applied to a filter 27 which operates to increase the slope of all trailing edge slopes in the signals applied thereto. The filtered signals are then applied to a pair of identical voltage difference detection circuits 29 and 31. Circuits 29 and 31 each operate to compare the slope amplitude of the trailing slopes applied thereto with a predetermined minimum amplitude and provide an output triggering signal to a latch 33. The latch 33 operates in a conventional manner in response to the pulses applied from voltage difference detectors 29 and 31. The two latch outputs are fed back to the circuits 29 and 31 respectively for aiding in clamping the input signals thereto in a manner which will be described in more detail in connection with FIG. 5. The purpose of latch 33 is to ensure that a gating pulse will not be generated unless the present slope, which meets the requirements of one of the circuits 29 and 31, is of opposite sense to the prior detected slope. For example, a positive slope in the raw readout signal meeting the minimum voltage requirements will result in an output triggering pulse from circuit 31. The latter output triggering pulse will reset latch 33, thereby triggering the single shot circuit 37 which generates the gating pulse. If the next slope which satisfies the minimum amplitude requirement is also a positive slope, thereby resulting in another output triggering pulse from circuit 31, the latch 33, already being in the reset state, will not be affected, and therefore no gating pulse will be generated. However, if the slope is a negative slope, the output triggering pulse will appear at the output of circuit 29 thereby resetting the latch and initiating the single shot circuit 35 to generate a gating pulse. Single shot circuits 35 and 36 generate gating pulses which are connected respectively to a pair of AND-gates 39 and 41 which are also connected respectively to the outputs of delay means 23 and 25. The peak pulses passing through delay means 23 and 25 and gated through AND-gates 39 and 41 respectively are applied through an OR-circuit 43 to a single shot circuit 45 whose output pulses are of a standard width and represent the data contained in the raw readout signal. In FIG. 3, the lead lag filter 27, voltage detection circuits 29 and 31, latch 33, and single shot circuits 35 and 37 correspond to the gate generator 15 of FIG. 1.

An example of one circuit for use as the voltage difference detectors 29 and 31, (both being identical) is illustrated in FIG. 5. The linear filtered signal from one of the lead lag filters 27 of FIG. 3 is applied to input terminal 300 of the voltage difference detector and an output pulse appears at output terminal 328 in response to a trailing slope having a voltage magnitude greater than a reference difference voltage $\Delta V$. The feedback from the latch 33, shown in FIG. 3, is connected to a transistor 306 via wire 308. The transistor 306 is conducting during the early portion of the positive going slope of the input signal and aids in clamping all positive peaks to a reference value $-V_R$.

The linear input signal from the lead lag filter is applied to an emitter-follower transistor 301. The emitter of transistor 301 is connected in series with diode 303 and resistance 305. The diode 303 is included in the circuit to prevent emitter base breakdown during the time when the clamping transistor 306 is conducting. The waveform at the junction of diode 303 and resistance 305 is applied to a charging capacitor 316 via a filter comprising capacitor 302 and resistance 304. The values of capacitor 302 and resistance 304 are chosen to permit a certain range of slope change to be applied to the capacitor 316. Any greater or lesser slope will be reduced by the RC time constants. The diode 310 operates as a clamping diode in conjunction with transistor 306 to clamp each positive peak to the reference potential $-V_R$ applied to terminal 312. In operation, during the positive going slope, the charge on capacitor 316 builds up to the positive peak but is clamped at $-V_R$. The conduction of transistor 306 during the initial part of the positive going slope assists in setting each positive peak at exactly $-V_R$ plus a diode voltage drop for diode 310. Following the positive peak, the voltage across the capacitor decays from the positive peak reference of $-V_R$ by discharging through resistance 314. The voltage across capacitor 316 is connected to the base terminal of transistor 322 which is normally conducting. The transistors 322 and 324 are differentially connected to provide an output pulse at the collector of transistor 322 when the voltage across capacitor 316 drops below the voltage applied to the base of transistor 324. The difference between the peak voltage on capacitor 316 ($-V_R$) and the voltage on the base of transistor 324 is the reference voltage difference. Thus, if the negative going slope of the input waveform has a slope magnitude greater than $\Delta V$, an output pulse will be produced.

The reference voltage difference $\Delta V$ is created by applying a voltage $-V$ to a terminal 321 which is connected through a resistance 317 to the joined emitters of transistors 322 and 324. Terminal 321 is also connected through a potentiometer 318, having wiper arm 320, to the terminal 312. The wiper arm 320 is connected to the base of transistor 324. It should be noted that $-V$ is more negative than $-V_R$ and thus the voltage applied to the base of transistor 324 is more negative than $-V_R$ and transistor 324 will be cut off at the positive peaks of the input waveform. The difference between $-V_R$ and the voltage on the base of transistor 324 is $\Delta V$. Thus, when the voltage on capacitor 316 drops from $-V_R$ an amount greater than $\Delta V$, transistor 322 will be cut off resulting in the positive going output pulse. An identical circuit to one described receives the linear signal phase reversed and therefore provides output pulses in response to slope trailing the opposite peaks. The output terminals from the two identical circuits are connected respectively to the reset and set inputs of the latch 33 of FIG. 3.

Figure 7:
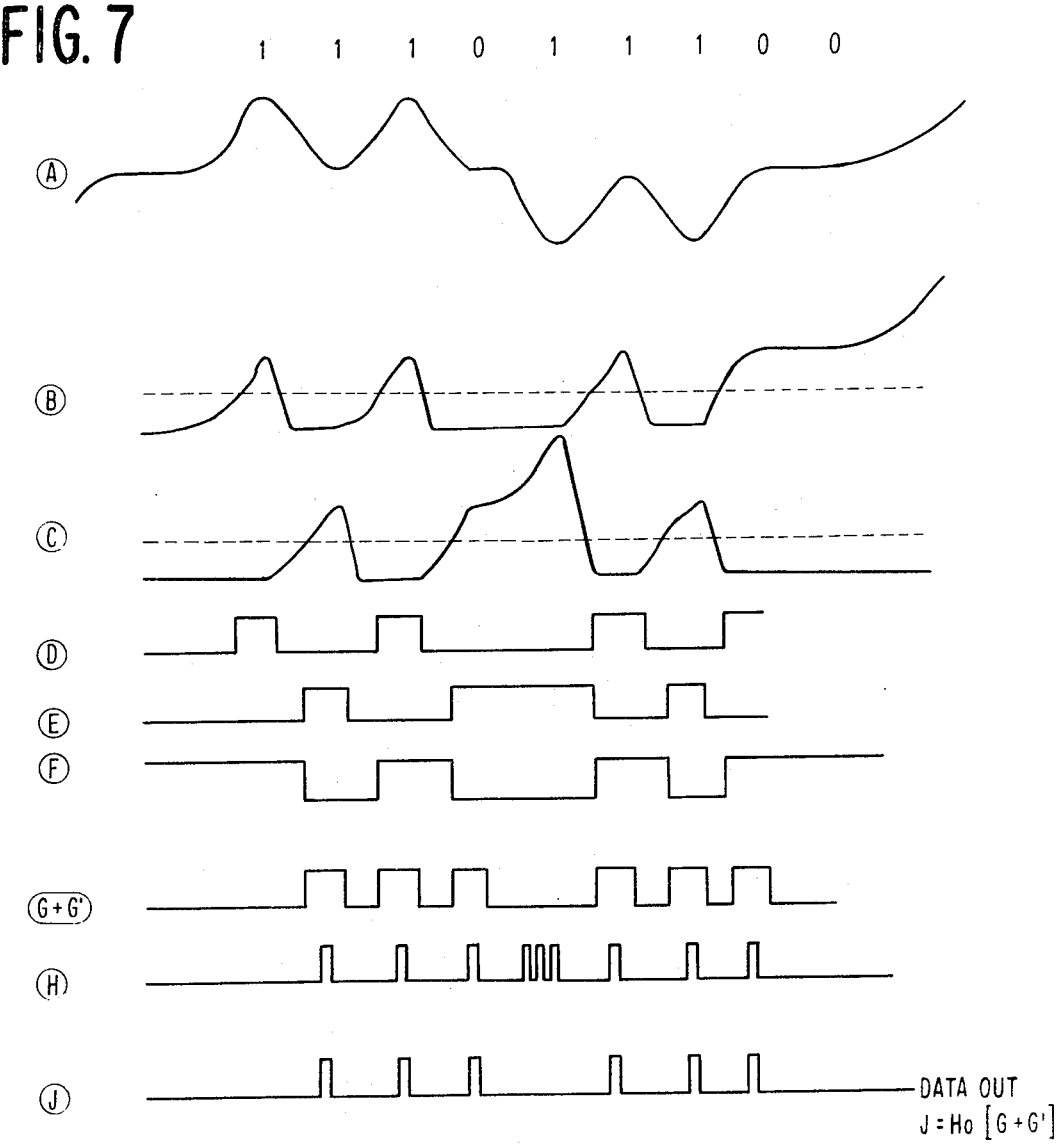
FIG. 7 is a series of waveforms applicable to the circuit of FIG. 6.

An alternative circuit for the gate generator means of FIG. 3 is illustrated in FIG. 6. The circuit of FIG. 6, when used in the block diagram embodiment of FIG. 3, would have its two input terminals connected to the output of linear amplifier 19 and its two output terminals connected respectively to the gating inputs of AND-gates 39 and 41. The waveforms shown in FIG. 7 and identified by A, B, C, D, E, F, and G represent the waveforms as they appear in the circuit of FIG. 6 at points identified by corresponding letters. Waveforms H and J represent respectively the delayed pulses which are detected by the peak detector and the latter pulses which are gated through the AND gates by the gating pulses.

The raw readout signal at 0° phase is applied at input terminal 2 and the raw readout signal at 180° phase is applied at input terminal 4. The circuitry which operates upon the signal applied at input terminal 4 is identical to the circuitry which operates upon the signal applied at terminal 2. Both circuits detect the positive going slope $\Delta V$ following a negative peak of the respective input signals. The values of the resistances and capacitances shown in FIG. 6 represent only one specific example of values which may be used in the circuit.

In contrast to the circuit described above and illustrated in FIG. 5, the circuit of FIG. 6 operates to clamp the negative peaks at a reference voltage and to detect the $\Delta V$ of the positive going slopes. Considering the linear signal applied at input terminal 2, the waveform appearing at the base terminal of transistor 12 has its negative peaks clamped or referenced to a reference potential of $-3$ volts shown in the example. The clamping action is provided by diode 11 with the assistance of transistor 16. The $\Delta V$ reference is set by the potential at the base of transistor 14 which is controlled by a 2K potentiometer. The output pulses generated in response to a detected slope appear at the collector of transistor 12 as negative going pulses. For the signal applied at input terminal 4, the output pulses appear at the collector of transistor 10 and are also negative going pulses. It can be seen that the clamping of the negative peaks of the input signal at terminal 4 as it appears at the base of transistor 10 are clamped to the same reference value, $-3$ volts, by diode 13 with the assistance of transistor 18. Also, the reference level set by transistor 14 and associated circuitry controls the conduction of transistor 10 as well as transistor 12.

In operation, as a negative going slope appears at input terminal 2 it will be clamped at $-3$ volts due to the conduction of diode 11. The clamping action is assisted by the conduction of transistor 16 through transistors 20 and 22. It can be seen that transistor 16 will be conducting during the negative going slope at input terminal 2 because the base of transistor 16 is connected to input terminal 4 which will simultaneously be receiving a positive going slope. Consequently, when the negative peak of the input signal at terminal 2 is reached, the voltage at the base of transistor 12 will be at the negative reference voltage of $-3$ volts (plus the forward drop of diode 11). As the input slope goes positive, diode 11 cuts off and transistor 16 also cuts off. The slope rises from the $-3$-volt reference level by an amount determined by the slope rise at the input terminal 2. If the rise goes above the reference potential appearing at the base of transistor 14, the transistor 12 will be rendered conductive, cutting off transistor 14, and resulting in a negative going output pulse at the collector of transistor 12. Output pulses are created at the collector of transistor 10 in an identical manner.

Assuming that input terminal 2 receives the signal at 0° phase and input terminal 4 receives the signal at 180° phase the negative going pulses at the collector of transistor 12 represent negative peaks satisfying the slope voltage difference requirement whereas the pulses appearing at the collector of transistor 10 represent positive peaks satisfying the slope requirement. The positive peak and negative peak pulses are applied to the set and reset inputs of a latch which comprises the interconnected AND-invert gates 24 and 26. Assuming that the last slope satisfying the voltage difference requirement was a trailing slope of a positive peak, the potential at the output of gate 26 will be high and the potential at the output of gate 24 will be low. If the next triggering pulse also appears at the collector of terminal 10, it will have no affect on the latch. However, if the next triggering pulse appears at the collector of terminal 12, it will cause the latch to switch states. The output of gate 24 will rise in potential causing the output of gate 26 to go low in potential. The low potential at the output of gate 26 holds the latch in this condition until a subsequent triggering pulse at the collector of transistor 10 is received. The negative going potential at the output of gate 26 is applied through the 68 picofarad capacitor to the base terminal of a transistor 30. The transistor 30 is normally conducting but is cut off by the negative potential applied to the base thereof. When the transistor is cut off, the collector thereof rises creating a positive going gating pulse representing the detection of a slope following a negative peak which satisfies the slope magnitude requirement. It will be noted that, due to the action of the 68-picofarad capacitor and the 5.1K resistance connected to the base of transistor 30, the output pulse only lasts for a short period of time even though the output of gate 26 remains at the low potential until a subsequent triggering pulse is received. The transistor 28 which is connected via a 63-picofarad capacitor to the output terminal of the gate 24 operates in the same manner as transistor 30. The output gating pulses appearing on the collector of transistor 28 represent negative going slopes of the original raw readout signal which satisfy the ΔV requirements.

Figure 8:
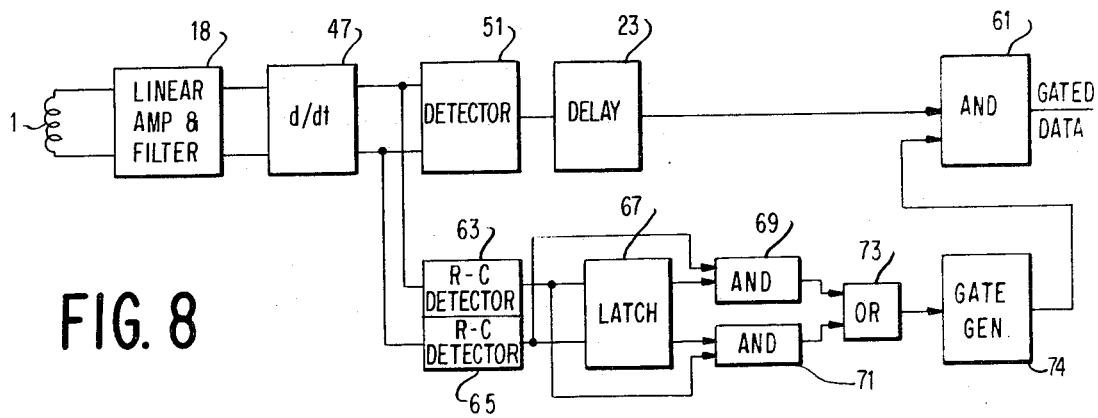
FIG. 8 is a block diagram of an alternate circuit embodying the inventive concept of the present application.

An alternative embodiment to the one shown in FIG. 3 is illustrated by the block diagram of FIG. 8. The primary difference between the block diagram of FIG. 8 and that of FIG. 3 is that in FIG. 8 the slope criteria is measured by detecting the amplitude of the readout signal after it is differentiated. In the differentiated signal the amplitude of the peaks represents the degree of the slope. In order to generate a gating output, the peaks of the differentiated signal must be above a minimum amplitude which is equal to the average of the differentiated signal, and each peak must have an amplitude above a percentage of the preceding peak. A first positive peak, representing the occurrence of a positive slope, is stored on a capacitor which is then allowed to discharge. With time, the voltage on the capacitor decays. The succeeding positive peak, representing the succeeding positive slope, is compared with the voltage on the capacitor. Thus, the closer a peak of a differentiated signal is to a prior peak of the same signal waveform, the higher its amplitude must be in order to result in the generation of a gating output pulse. Since the peak amplitude of the differentiated signal represents slope steepness and since the time between peaks is an indication of slope duration, a differentiated signal which satisfies the above-mentioned criteria represents a slope having sufficient magnitude ΔV to be recognized as a data bit.

Figure 4:
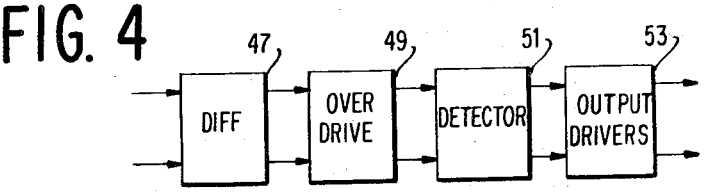
FIG. 4 is a block diagram of the FM slope detector, used in the circuit of FIG. 3.

In FIG. 8, the differentiator 47 corresponds to the differentiator of FIG. 4 and the detector 51 corresponds to the detector of FIG. 4. The overdrive amplifiers 49 and output driver amplifiers 53 of FIG. 4 are preferably included in FIG. 8 but are not shown therein. Also, it will be noted that in FIG. 8 the outputs of the detector 51 are combined to provide a single output which is delayed by a single delay means 23 and connected to a single AND-gate 61. Also, the gating pulses which are generated by the slope detecting circuitry are connected to an OR-gate 73 whose output, in turn, is connected to a gate generator 74 which may be a single shot corresponding to single shot 45 of FIG. 3. It will be apparent that the delay means 23 and AND-gate 61 of FIG. 8 may be replaced by a pair of delay means and a pair of AND gates such as that used in FIG. 3, or in the alternative may be substituted for the pair of delay means and the pair of AND gates used in FIG. 3.

Figure 9:
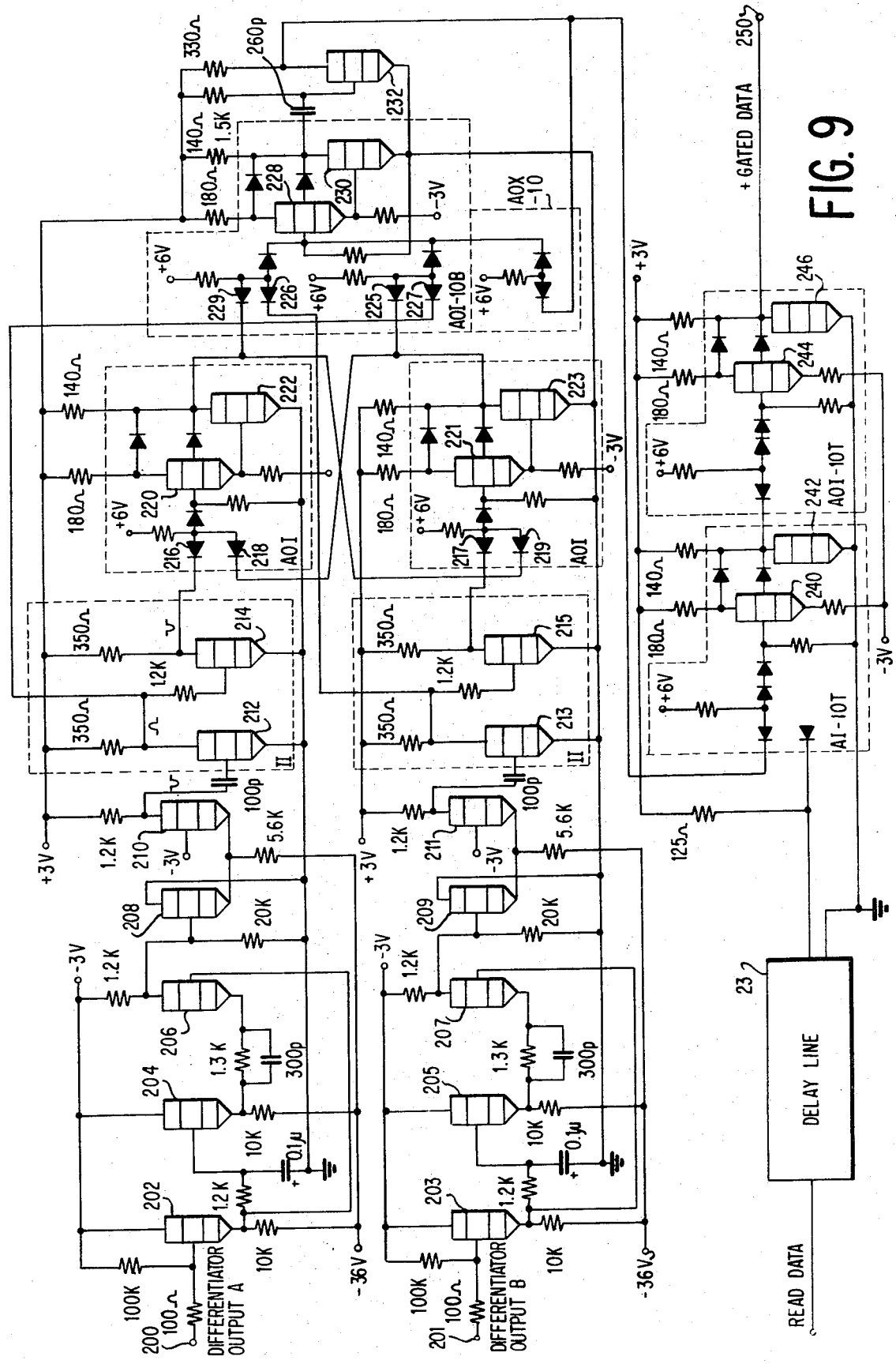
FIG. 9 is a schematic circuit diagram of a portion of FIG. 8.

The differentiator 47 forms a part of the peak detecting channel and the slope detecting channel in the embodiment of FIG. 8. It will also be apparent that each channel may have its own individual differentiator circuit. The differentiator waveforms, representing respectively the 0° phase readout signal differentiated and the 180° phase readout signal differentiated are applied to a pair of RC detector circuits 63 and 65. The RC detector circuits operate to provide an output pulse if the input peak is above a preset minimum and above a percentage of the previous peak as explained above. The output pulses from the RC detector circuits are applied to a latch 67 and also to AND-gates 69 and 71. The latch 67 in combination with AND-gates 69 and 71 operates to ensure that a gating pulse is not generated unless a pulse output from either one of the RC detector circuits is preceded by a pulse output from the other RC detector circuit. The circuit of FIG. 8 illustrated by blocks 63, 65, 67, 69, 71, 73, 74, and 61 is illustrated in schematic form in FIG. 9.

The 0° phase and 180° phase signals after being differentiated by the differentiator 47 of FIG. 8 are applied respectively to terminals 200 and 201. The circuitry of the 0° phase channel including transistors 202, 204, 206, 208, 210, 212, and 214 is identical to the circuitry in the 180° phase channel including transistors 203, 205, 207, 209, 211, 213, and 215. Therefore, only the 0° phase channel will be described in any detail. The input signal is applied to an emitter follower 202 whose output is applied to a filter and also to the base of transistor 206. The filter, including the 1.2K resistor and the 0.1-microfarad capacitor, serves to provide a voltage at the base of transistor 204 representing the average of the differentiated input signal. When the input signal rises above the average amplitude, transistor 206 conducts and charges the 300-picofarad storage capacitor to the peak value. As the peak drops off, the 300-picofarad storage capacitor discharges through the 1.3K resistor. Each time the input signal rises above the voltage on the storage capacitor, transistor 206 will conduct. Thus, a positive going output pulse at the collector of transistor 206 is an indication that a peak of the differentiated signal (corresponding to a slope of the readout signal) has met the requirements of duration and amplitude set by the averaging circuit and the storage capacitor circuit. The positive going output pulse from the collector of transistor 206 is shaped and amplified by an amplifier circuit including transistors 208 and 210 and applied as a negative going pulse to a circuit which includes transistors 212 and 214. The circuit including transistors 212 and 214 provides two outputs—a positive going output at the collector of transistor 212 and a negative going output pulse at the collector of transistor 214. Similar outputs corresponding to opposite sense slopes detected by the corresponding circuitry appear at the collector of transistor 213 and the collector of transistor 215. The negative going pulse from the collector of transistor 214 operates to set a latch, corresponding to latch 67 of FIG. 8, which comprises a pair of cross-connected AND-invert circuits. One of the AND-invert circuits includes diodes 216 and 218, and transistors 220 and 222. The other AND-invert circuit includes diodes 217 and 219, and transistors 221 and 223. The latch is set by a negative going pulse at the cathode of diode 216 and is reset by a negative going pulse at the cathode of diode 217. When in the set condition, the upper output of the latch, taken at the collector of transistor 222, is a high level voltage whereas the lower output of the latch taken from the collector of transistor 223 is a low level voltage. When in the reset condition, the voltage levels of the two outputs are reversed.

The circuit including diodes 224 and 226 corresponds to the AND-gate 69 of FIG. 8, and the circuit including diodes 225 and 227 corresponds to the AND-gate 71 of FIG. 8. Assuming that a slope of opposite sense was previously detected, and thereby the latch is in the reset condition, the cathode of diode 225 will be at a high level voltage. The occurrence of a positive going pulse at the collector of transistor 212 raises the cathode of diode 227 to a high level voltage thereby resulting in an output from the AND gate which includes diodes 225 and 227. The latter condition triggers a gate pulse generating circuit which includes transistors 228, 230, and 232. A positive going gating pulse from the latter circuit is applied as one input to an AND gate, the other input coming from the delay means 23. The latter mentioned AND gate includes the circuitry of transistors 240, 242, 244, and 246, and operates to gate the peak detected pulses from the peak detector channel to an output terminal 250.

What we claim is:

1. A readout circuit for detecting high density signal data in a raw readout signal comprising:
   a. peak detecting channel means for detecting peaks in said raw readout signal and providing output indicating said peaks,
   b. slope detecting channel means for detecting slopes in said raw readout signal meeting preset slope sense and amplitude requirements and providing a gating pulse for each detected slope, said slope detecting channel means including means for clamping selected peaks in said raw readout signal to provide a reference level against which slope amplitudes are measured, and
   c. gating means connected to said peak detecting and slope detecting channel means responsive to each gating pulse representing a given detected slope of said raw readout signal for passing to an output terminal the peak detector output resulting from detection of the peak of said detected slope.

2. A readout circuit for detecting high density signal data comprising:
   a. first and second signal channels for receiving a raw readout signal,
   b. said first channel including means for detecting those portions of the readout signal having peaks greater than a predetermined amplitude, and means for delaying such detected signal portions,
   c. said second channel including means for detecting only those signal portions having slopes of opposite phase than the previously detected slopes and which are greater than a predetermined slope and duration, and
   d. gating means at the output of said first channel for passing only those signals that have the proper slope sense and pulse amplitude, and which are coincident with the detected signal peaks.

3. A readout circuit for detecting high density signal data in a raw readout signal comprising:
   a. peak detecting channel means for detecting peaks in said raw readout signal and providing output indicating said peaks,
   b. slope detecting channel means for detecting slopes in said raw readout signal meeting preset slope sense and amplitude requirements and providing a gating pulse for each detected slope, and
   c. gating means connected to said peak detecting and slope detecting channel means responsive to each gating pulse representing a given detected slope of said raw readout signal for passing to an output terminal the peak detector output resulting from detection of the peak of said detected slope,
   wherein said slope detector channel means comprises:
   slope amplitude detecting means for detecting slope voltage change greater than a preset minimum,
   slope sense memory means connected to said slope amplitude detection means for storing an indication of the sense of the last slope detected to said slope amplitude detecting means, and
   gate generating means for generating said gating pulse in response to the detection of a slope amplitude from said slope amplitude detecting means wherein said detected slope has a sense opposite to the sense indicated by and stored in said slope sense memory.

4. The readout circuit as claimed in claim 3 wherein said slope detector channel means comprises:
   a. first means for generating an output pulse on a first output terminal in response to each positive going slope of said readout signal having a voltage change from a negative peak greater than a predetermined amount,
   b. second means for generating an output pulse on a second output terminal in response to each negative going slope of said readout signal having a voltage change from going slope positive peak greater than said predetermined amount, and
   c. logic means connected to said first and second output terminals for generating a gating pulse in response to each said output pulse provided the preceding said output pulse appeared on the opposite output terminal.

5. The readout circuit as claimed in claim 3 wherein said peak detecting channel means comprises a peak detector means for providing peak output pulses and a delay means connected to said peak detector output for delaying said peak output pulses.

6. The readout circuit as claimed in claim 5 wherein said slope detector channel means comprises:
   a. slope amplitude detecting means for detecting slope voltage change greater than a preset minimum,
   b. slope sense memory means connected to said slope amplitude detection means for storing an indication of the sense of the last slope detected by said slope amplitude detecting means, and
   c. gate generating means for generating said gating pulse in response to the detection of a slope amplitude from said slope amplitude detecting means wherein said detected slope has a sense opposite to the sense indicated by and stored in said slope sense memory.

7. The readout circuit as claimed in claim 5 wherein said slope detector channel means comprises:
   a. first means for generating an output pulse on a first output terminal in response to each positive going slope of said readout signal having a voltage change from a negative peak greater than a predetermined amount,
   b. second means for generating an output pulse on a second output terminal in response to each negative going slope of said readout signal having a voltage change from a positive peak greater than said predetermined amount, and
   c. logic means connected to said first and second output terminals for generating a gating pulse in response to each said output pulse provided the preceding said output pulse appeared on the opposite output terminal.

8. The readout circuit as claimed in claim 7 wherein said first and second means are identical and one of said first and second means receives said raw readout signal and the other of said first and second means receives said raw readout signal phase reversed.

9. The readout circuit as claimed in claim 8 wherein said first means comprises:
   a. clamping means for clamping all negative peaks of the signal applied thereto to a reference potential,
   b. means connecting said raw readout signal to said clamping means, and
   c. comparison means connected to said clamping means for providing an output pulse when said clamped signal rises above said reference by a predetermined amount.

10. The readout circuit as claimed in claim 8 wherein said first means comprises:
    a. clamping means for clamping all positive peaks of the signal applied thereto to a reference potential,
    b. means connecting said raw readout signal to said clamping means, and
    c. comparison means connected to said clamping means for providing an output pulse when said clamped signal goes below said reference by a predetermined amount.

* * * * *